(12) United States Patent
Totale et al.

(10) Patent No.: US 9,841,863 B1
(45) Date of Patent: Dec. 12, 2017

(54) MECHANISM FOR PARTIAL PAGE REFRESH USING URL ADDRESSABLE HIERARCHICAL PAGE STRUCTURE

(71) Applicant: Open Text Corporation, Waterloo (CA)

(72) Inventors: Sachin G. Totale, Bangalore (IN); Rajakumar Thiruvasagam, Bangalore (IN); Linda J. Wong, Dublin, CA (US); Julian M. Hjortshoj, Boston, MA (US); Frederick F. Hewett, Cambridge, MA (US)

(73) Assignee: Open Text Corporation, Waterloo (CA)

( * ) Notice: Subject to any disclaimer, the term of this patent is extended or adjusted under 35 U.S.C. 154(b) by 363 days.

(21) Appl. No.: 13/722,833

(22) Filed: Dec. 20, 2012

(51) Int. Cl.
- *G06F 3/048* (2013.01)
- *G06F 3/00* (2006.01)
- *G06F 17/30* (2006.01)
- *G06F 17/00* (2006.01)

(52) U.S. Cl.
CPC .............. *G06F 3/048* (2013.01); *G06F 17/30* (2013.01)

(58) Field of Classification Search
CPC . G06F 3/048; G06F 17/30; G06F 3/00; G06F 17/00
USPC ......................................................... 715/738
See application file for complete search history.

(56) References Cited

U.S. PATENT DOCUMENTS

| | | | | |
|---|---|---|---|---|
| 7,069,497 B1* | 6/2006 | Desai | ................... | G06F 17/3089 707/E17.116 |
| 7,155,517 B1* | 12/2006 | Koponen | .......... | G06F 17/30902 707/999.01 |
| 7,346,842 B1* | 3/2008 | Hayton | ............. | G06F 17/30902 705/64 |
| 7,599,920 B1* | 10/2009 | Fox | .................... | G06F 17/30864 |
| 7,984,375 B1* | 7/2011 | Jaramillo | .................. | G06F 8/70 715/229 |
| 8,042,036 B1* | 10/2011 | Sharma | ............. | G06F 17/30882 715/208 |
| 2004/0027391 A1* | 2/2004 | Tu | ...................... | G06F 17/30873 715/810 |
| 2004/0066531 A1* | 4/2004 | Kim | .................. | G06F 17/30876 358/1.15 |
| 2005/0149576 A1* | 7/2005 | Marmaros | ......... | G06F 17/30899 |
| 2005/0204047 A1* | 9/2005 | Mitchell | ................. | H04L 67/02 709/228 |
| 2005/0235256 A1* | 10/2005 | Freydl | ....................... | G06F 8/34 717/107 |
| 2007/0083533 A1* | 4/2007 | Mirkazemi | ......... | G06F 17/3089 |

(Continued)

*Primary Examiner* — Jennifer To
*Assistant Examiner* — Hugo Molina
(74) *Attorney, Agent, or Firm* — Sprinkle IP Law Group (57) ABSTRACT

An apparatus, method, and system using techniques to partially refresh a display page. A navigation URL generated by an application in response to a user interaction is received, the navigation URL indicating a place within a page hierarchy at which a partial refresh of a page with which the navigation URL is associated is to be performed and the navigation URL including one or more URL portions usable to retrieve page content data to be used to partially refresh the page. The navigation URL is processed to determine the place within the page hierarchy at which the partial refresh is to be performed. The navigation URL is used to retrieve the page content data.

26 Claims, 6 Drawing Sheets

(56) References Cited

U.S. PATENT DOCUMENTS

| | | | | |
|---|---|---|---|---|
| 2007/0130293 A1* | 6/2007 | Dong | G06F 17/3089 | 709/219 |
| 2007/0143672 A1* | 6/2007 | Lipton | G06F 17/30899 | 715/205 |
| 2007/0276921 A1* | 11/2007 | Riggs | G06F 17/30876 | 709/217 |
| 2007/0300162 A1* | 12/2007 | Goto | G06F 17/30899 | 715/745 |
| 2008/0120368 A1* | 5/2008 | Gale | G06F 17/2211 | 709/203 |
| 2009/0019133 A1* | 1/2009 | Brimley | G06F 17/30902 | 709/218 |
| 2009/0070706 A1* | 3/2009 | Ranganath | G06Q 30/02 | 715/787 |
| 2009/0248866 A1* | 10/2009 | Fujishima | H04L 12/6418 | 709/224 |
| 2010/0017702 A1* | 1/2010 | Carroll | G06F 17/30958 | 715/234 |
| 2010/0235402 A1* | 9/2010 | Han | G06F 17/3089 | 707/802 |
| 2010/0299205 A1* | 11/2010 | Erdmann | G06F 21/6263 | 705/14.54 |
| 2010/0332965 A1* | 12/2010 | Carraher | G06F 17/2235 | 715/231 |
| 2011/0191407 A1* | 8/2011 | Fu | G06F 8/38 | 709/203 |
| 2011/0289393 A1* | 11/2011 | Choi | G06F 17/30899 | 715/205 |
| 2011/0302285 A1* | 12/2011 | D'Angelo | G06F 17/3089 | 709/222 |
| 2012/0089589 A1* | 4/2012 | Tsao | B66C 1/422 | 707/707 |
| 2012/0221505 A1* | 8/2012 | Evans | G06Q 10/10 | 706/52 |
| 2012/0221931 A1* | 8/2012 | Gleadall | G06F 17/30902 | 715/208 |
| 2012/0254292 A1* | 10/2012 | Newton et al. | | 709/203 |
| 2012/0254722 A1* | 10/2012 | Newton | G06F 8/38 | 715/234 |
| 2012/0284686 A1* | 11/2012 | Sharrma | G06F 8/38 | 717/109 |
| 2012/0324377 A1* | 12/2012 | Allington | G06F 8/38 | 715/763 |
| 2013/0103736 A1* | 4/2013 | Domsalla | H04L 67/143 | 709/203 |
| 2013/0159890 A1* | 6/2013 | Rossi | G06F 11/3608 | 715/762 |
| 2013/0204867 A1* | 8/2013 | Lim | G06F 17/3053 | 707/723 |
| 2014/0019850 A1* | 1/2014 | Goel | G06F 17/212 | 715/243 |
| 2014/0089772 A1* | 3/2014 | Shetty | G06F 17/3089 | 715/206 |

\* cited by examiner

MECHANISM FOR PARTIAL PAGE REFRESH USING URL ADDRESSABLE HIERARCHICAL PAGE STRUCTURE

In modern web applications, user interaction often results in a partial page (web browser window) refresh. In classical web applications the interactions on a page are pre-defined, and partial page refreshes are handled by the refresh logic implemented as part of the event handlers.

But in case of composed applications, e.g., one made using developer tools such as EMC Corporation's xCP platform, pages are composed by business consultants using composition tools (such as xCP designer). Depending on the business requirements, usually some section of composed page has to be refreshed to show additional information based on the current context (e.g. change of selected document in a folder tree). Typically, the additional information is displayed using separately composed pages. These composed pages have to be retrofitted based on the current context.

The classical partial page refresh mechanism typically relies on developers' custom code to glue pages together with each other in order to enable partial page refresh. For composed applications, it is not practical to rely on developers to connect application pages, because in the case of a composed application all pages typically are composed by business users who do not have programming skills.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A mechanism for partial page refresh using a URL addressable hierarchical page structure is proposed. In various embodiments, page hierarchies are established through the concept of master pages, application pages and instance pages. All of these pages are URL addressable. In some embodiments, the browser URL identifies the current context and is used to determine the granularity of the page refresh, e.g., which part(s) of the page and at which level(s) in the hierarchy is/are required to be refreshed.

In various embodiments, as a user interacts with the application, the URL anchor (#) in the browser address bar gets updated which in turn modifies the current context and invokes the required granularity of refresh on the page. To perform this, the modified URL anchor is compared with previous page URL anchor to find the point in the page hierarchy from where the refresh should begin. The refresh cascades to all the page sections underneath.

A page is the basic unit of user interface presentation. In various embodiments, the pages comprising an application's user interface are created and composed at design time, e.g., by dragging and drop widgets onto a page composition interface. Once the application is deployed, its pages are rendered, for example based on user requests or other user interactions, etc., and the widgets and other content and controls added to the page at design time are displayed and associated user interface functionality, as applicable, provided.

In some embodiments, depending on the page composition, different hierarchies of the page can be formed as follows:

1. Master→Application page
2. Master→Instance page
3. Master→Application page→Instance page Such composition hierarchy opens up the possibility to compose multilevel pages as needed to meet business requirements.

In some embodiments, an application's "master page" is the top-most page in the page hierarchy. Typically a master page has of menus for application level operations, logos, a global search option, etc. A master page has a designated area to display application or instance pages. The next level down in the page hierarchy in some embodiments is the "application page". These pages are used to display information outside the context of an instance of any given object. They are typically used as the home page of the application, search pages, list pages, and administration pages. Finally, in the above example "instance pages" are at the lowest level of the page hierarchy. In some embodiments, these pages are used to create, display, and update data of a data bearing object type associated with the instance page. For example, in a loan application and/or approval application, an instance page may be used to display data about a particular customer or an item that will/would serve as collateral for the loan. While in certain examples described herein the master page—application page—instance page hierarchy is described, techniques described herein may be used to provide partial page refresh functionality based on any hierarchical page structure.

In various embodiments, the page uniform resource locator (URL), e.g., the URL as shown in the web browser's address bar, embodies information used to perform partial page refresh. The navigation URL contains information needed to determine which part of the page is to be refreshed and information required to obtain, e.g., from a remote server, the page markup (HTML or other markup code) required to render just the part required to be refreshed. In some embodiments, a "navigation manager" entity provided at the client system, for example JavaScript or other client-side code, compares a newly received URL to the URL of the previous (most recently rendered) page and determines, based on which part has changed, which portion of the page is to be refreshed and which page markup is to be obtained from the server. At the server side, in some embodiments a page controller (e.g., a REST service) is provided and configured to server page markup, for example in response to requests from the client side navigation manager. During application development, user actions such as selection or other identification of application pages, instance pages, and/or data objects associated therewith are defined and if a partial page refresh may be required in response a navigation URL representing the part of the page to be refreshed, its place in the page hierarchy, and the page markup to be obtained from the server to perform the refresh is associated with the action and the application is configured to provide the generated navigation URL to the navigation manager at runtime, if the associated action is taken by a user at runtime, to cause the navigation manager to perform the partial page request as defined herein.

In various embodiments, the navigation manager compares the previous and current navigation URLs and figures out the granularity in the page hierarchy which requires refresh. This triggers a cascading refresh of individual sections of the page. The navigation manager sends a request to the page controller to get page markup, and then refreshes the affected section of a page with new content.

In some embodiments, the user accesses the application, for example by selecting a bookmarked URL or clicking on a navigation menu option and logging in. If the user performs an action that requires a partial page refresh, in some embodiments the following occurs:

From the navigation URL, the navigation manager builds list of pages involved in page hierarchy.

The navigation manager compares the current page hierarchy with the previous URL page hierarchy and finds the level in the page hierarchy that requires refresh (aka refresh start level).

The navigation manager calls the page controller (server side) to get the page configuration (markup) for each page URL starting from the refresh start level to the end of the page URL list.

The navigation manager replaces the retrieved page markup at the corresponding level in the page hierarchy. The child pages from this level down get refreshed when the parent page renders.

Figure 1:
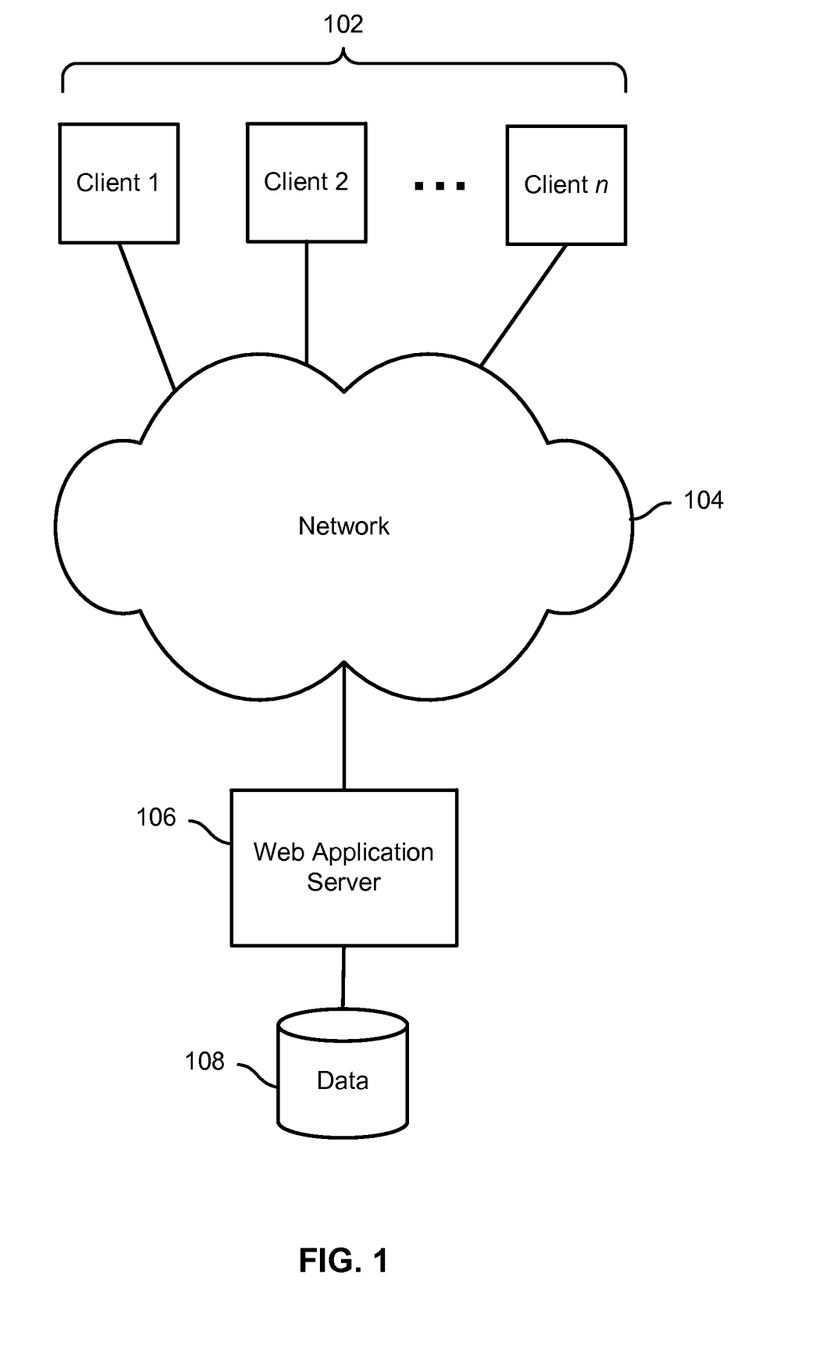
FIG. 1 is a block diagram illustrating an embodiment of a system to perform partial page refresh using a URL based mechanism.

FIG. 1 is a block diagram illustrating an embodiment of a system to perform partial page refresh using a URL based mechanism. In the example shown, a plurality of client systems 102 connect via the Internet or another network 104 with a web-based application server 106. In some embodiments, web-based application server 106 provides access to a composed application, such an application created using a development tool such as EMC Corporation's xCP application designer and/or platform. Applications running on web-based application server 106 store application-related data in a data store 108, such as an EMC Documentum or other content management system and/or repository. Data object instances stored in data store 108 may be used to populate and display an "instance page" of the application, for example.

Figure 2:
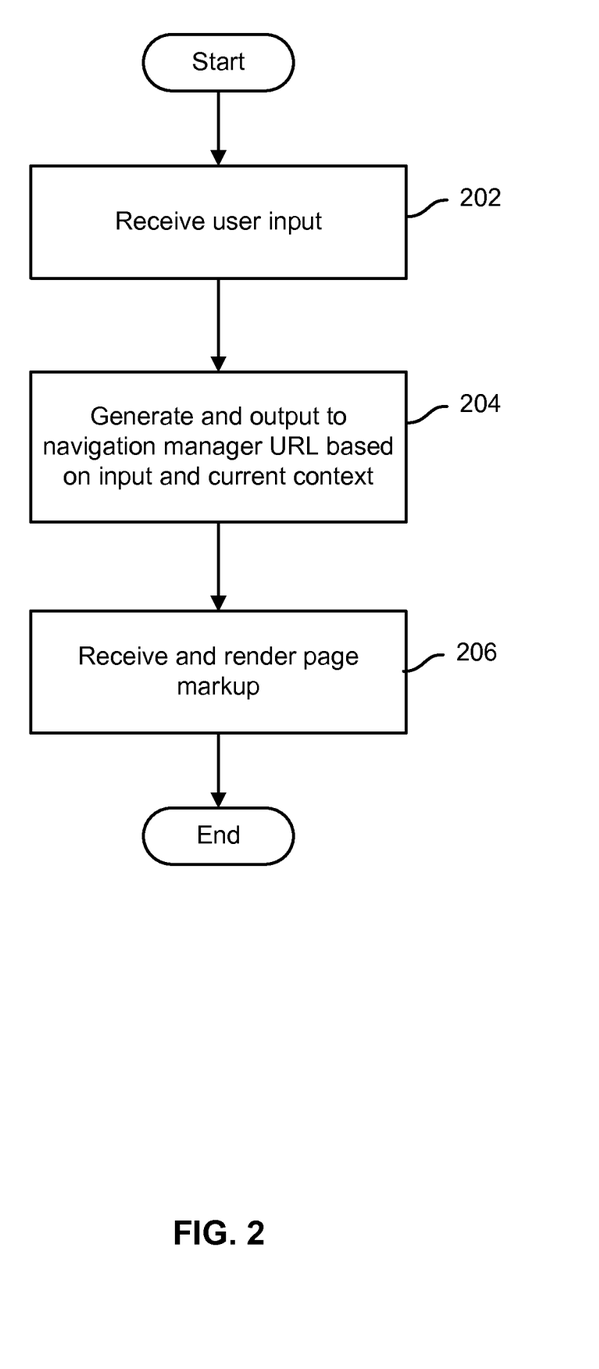
FIG. 2 is a flow chart illustrating an embodiment of a process to perform a partial page refresh.

FIG. 2 is a flow chart illustrating an embodiment of a process to perform a partial page refresh. In various embodiments, the process of FIG. 2 is performed by a composed application. A user input is received, for example, selection of a data object or folder within a hierarchy of data objects and/or folders, selection of a bookmark, entry of an object instance identifier, etc. (202). An associated URL based on the user input and/or a current application context is generated and provided as output, for example to a navigation manager (204). Page markup to refresh a part of the currently displayed page is received and used to partially refresh the page (206).

Figure 3:
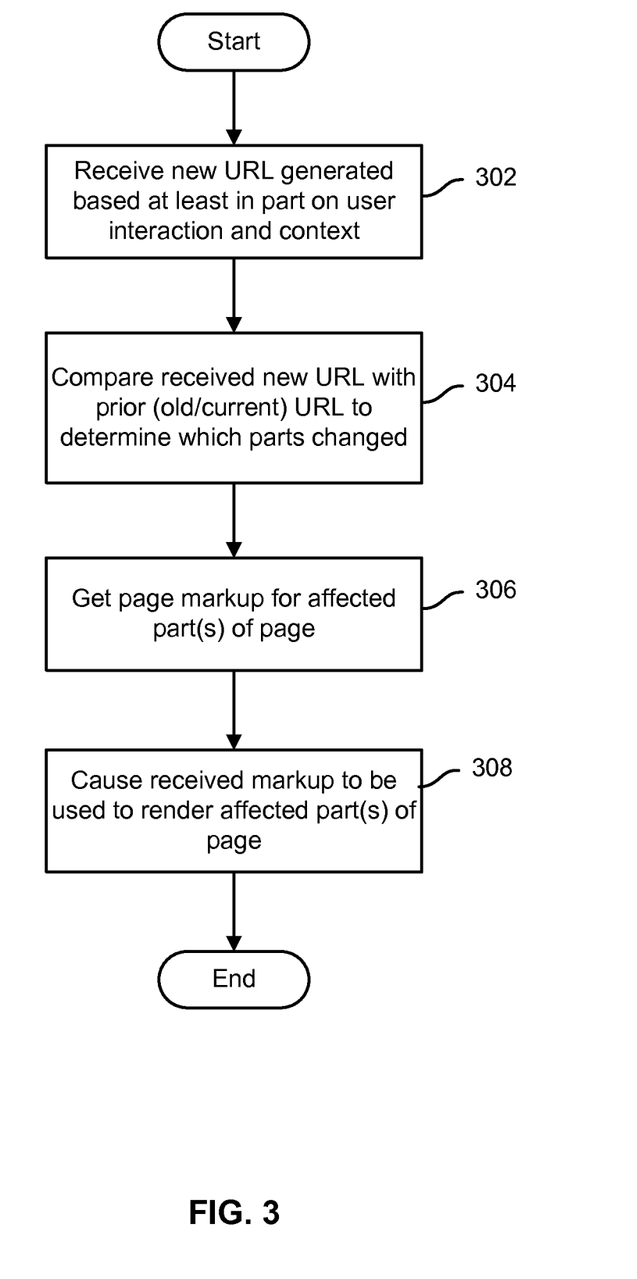
FIG. 3 is a flow chart illustrating an embodiment of a process to partially refresh a page.

FIG. 3 is a flow chart illustrating an embodiment of a process to partially refresh a page. In some embodiments, the process of FIG. 3 is implemented by a navigation manager running at the client system. In the example shown, a new URL generated based at least in part on a user interaction and an application context is received (302). For example, the URL may be formed based on a URL template embodied in the application code, populated using one or more data values associated with the current context, such as an identifier or other attribute associated with a data object associated with the current context (e.g., customer id, product id, etc.). The received new URL is compared to a previously-rendered URL to determine which parts have changed and at which levels in the page hierarchy (304). Page markup (e.g., HTML) for the affected page part(s) is obtained (306), for example from a remote server. The received markup is caused to be used to refresh affected portions of the page (308).

Figure 4:
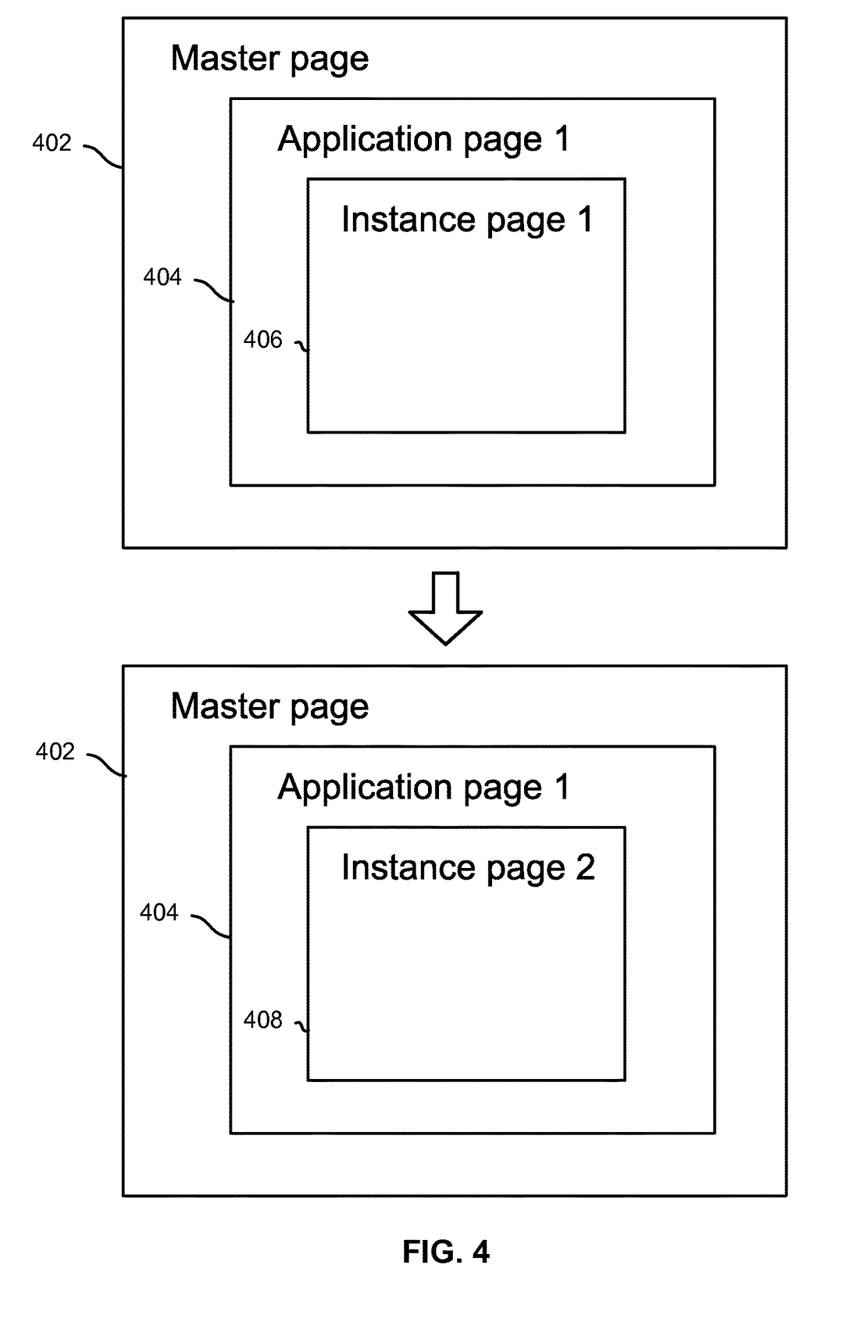
FIG. 4 is a block diagram illustrating an example of a URL-based partial page refresh.

FIG. 4 is a block diagram illustrating an example of a URL-based partial page refresh. In the example shown, initially a master page 402 is displayed with an application page 404 and a first instance page 406. For example, first instance page 406 may include and display data about a particular customer. In response to a user or other action, a partial page refresh is performed to replace just the first instance page 406 with a second instance page 408. For example, a page that includes an instance page that shows details about a first customer may be partially refreshed to replace the first instance page with a second instance page having details about a second customer.

Figure 5:
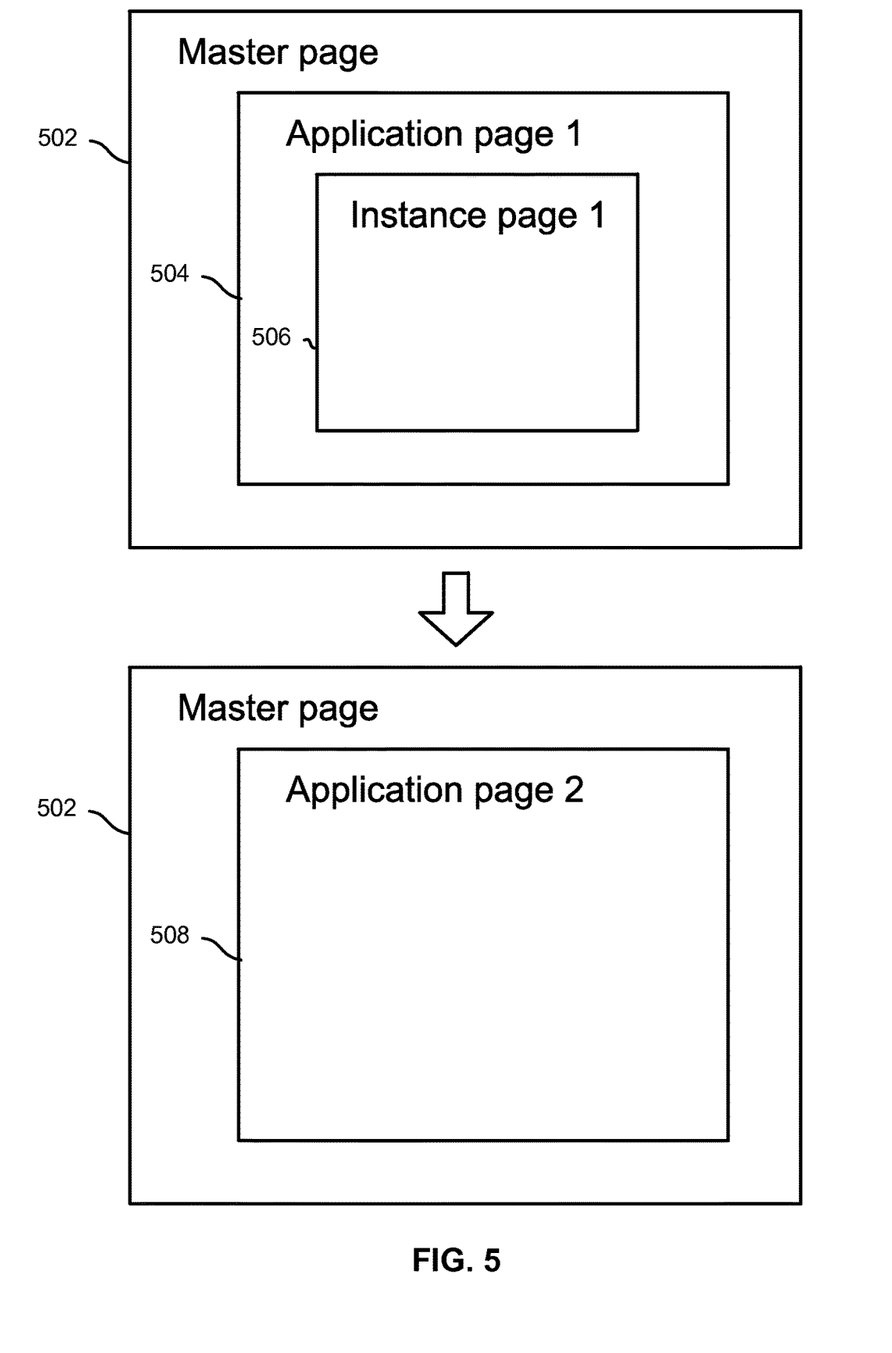
FIG. 5 is a block diagram illustrating an example of a URL-based partial page refresh.

FIG. 5 is a block diagram illustrating an example of a URL-based partial page refresh. In the example shown, initially a master page 502 is displayed with a first application page 504 and a first instance page 506. In response to a user or other action, a partial page refresh is performed to replace the first application page 504 and first instance page 508 with a second application page 508. For example a customer information application page with a customer detail instance page that includes detailed information about a particular customer may be replaced with a company-wide summary page that includes information across customers.

Figure 6:
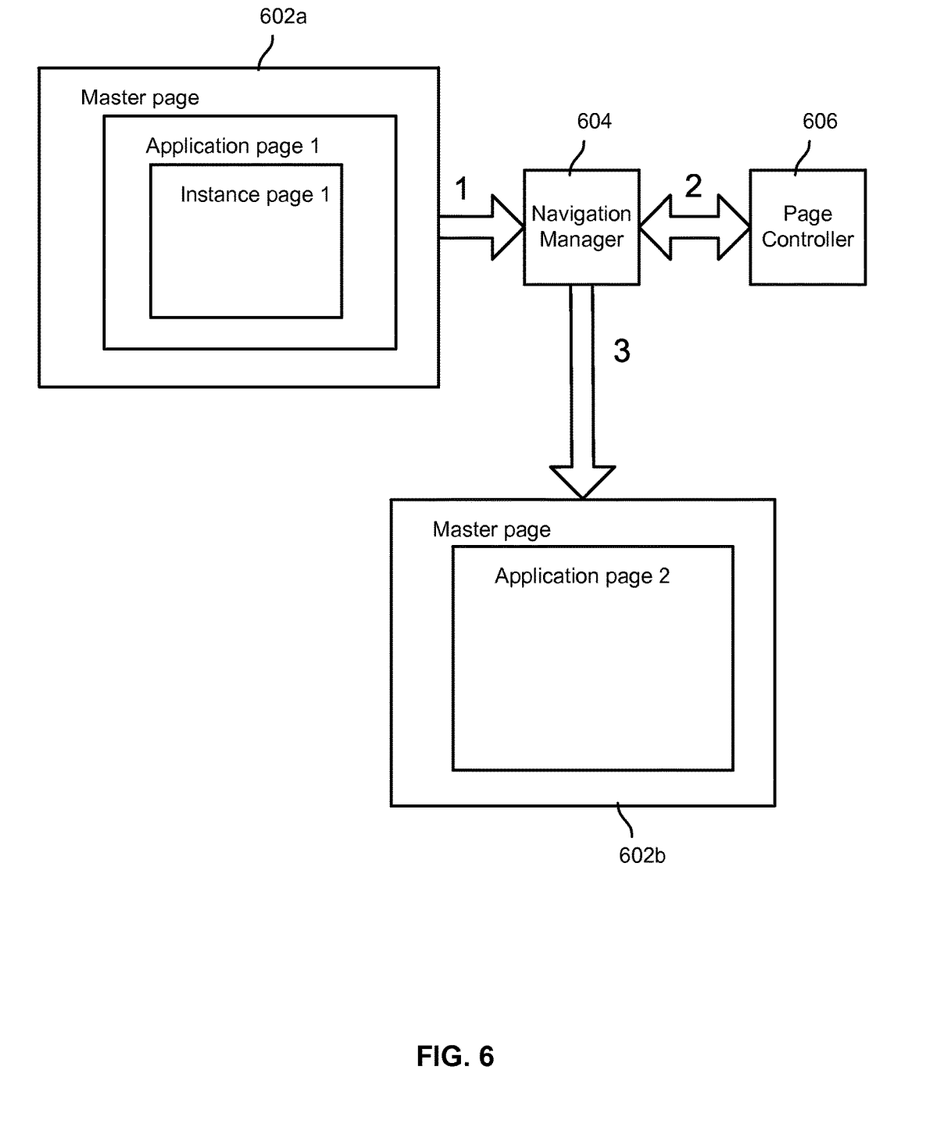
FIG. 6 is a block diagram illustrating an embodiment of a system to perform a partial page refresh.

FIG. 6 is a block diagram illustrating an embodiment of a system to perform a partial page refresh. In the example shown, a first page 602a includes a master page, a first application page, and an instance page. Upon a user or other action, a new URL is output (arrow "1" in FIG. 6) and provided to a navigation manager 604. The navigation manager compares the received URL to the URL associated with page 602a to determine which parts of the page are to be refreshed, and to retrieve corresponding page markup from page controller 606 (arrow "2"). The received page markup is used to refresh affected parts of the page to render refreshed page 602b, which includes the master page and a second application-level page.

In some embodiments, for example, the page 602a may be associated with the following URL: http://server:port/dempapp/#apppage1/customer/34242/details, in which the anchor "#" indicates the part to be refreshed, the portion "apppage1" is recognized by the navigation manager to comprise an application page level portion of the URL, and the remainder indicates an instance page, in this example a customer detail page for a customer having id 34242. To render a new page having the following URL: http://server:port/dempapp/#company/5552342/summary, the navigation manager recognizes from the placement of the anchor "#" that the application level page portion and its child level (instance page) are to be refreshed, and uses the following part of the URL, "company/5552342/summary" to obtain the page markup needed to render the new application page portion of the page.

Using techniques disclosed herein, partial page refreshed may be provided using a navigation URL based mechanism, as described above. This approach enables partial page refreshes to be defined and provided in the context of a composed application, created by a business user with no or limited programming skills who may not have been able to define a JavaScript or other component to perform partial page refresh, for example based on an application context such as a particular data object instance.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of partially refreshing a page, comprising:
   receiving a navigation Uniform Resource Locator (URL) generated by an application in response to a user interaction, wherein the navigation URL is associated with an address of a multi-level page comprising a plurality of levels associated with a page hierarchy of the multi-level page, and indicates a place within the page hierarchy at which a partial refresh of the multi-level page with which the navigation URL is associated is to be performed, wherein the navigation URL includes one or more URL anchors usable to retrieve page content data to be used to partially refresh the multi-level page, and wherein one or more of the plurality of levels of the multi-level page have corresponding one or more page sections in which content is provided;
   updating at least one URL anchor in a browser address bar with the one or more URL anchors as a user interacts with the application;
   modifying a current context in association with the update of the at least one URL anchor;
   comparing an updated URL anchor with a previous page URL anchor;
   determining the place within the page hierarchy of the multi-level page associated with the navigation URL at which the partial refresh is to be performed, wherein the place within the page hierarchy of the multi-level page is determined based at least in part on the comparison of the updated URL anchor with the previous page URL anchor;
   determining which of the plurality of levels of the multi-level page are to be refreshed based at least in part on the place within the page hierarchy of the multi-level page associated with the navigation URL at which the partial refresh is to be performed;
   determining which page content to retrieve based at least in part on the plurality of levels of the multi-level page determined to be refreshed; and
   retrieving page content data for the determined page content based at least in part on the navigation URL.

2. The method of claim 1, wherein an application with which the multi-level page is associated is configured to provide the navigation URL in response to one or both of a user interaction and an application context.

3. The method of claim 2, wherein the application is configured to provide the navigation URL at least in part by updating a location of the one or more URL anchors included in the navigation URL.

4. The method of claim 3, wherein processing the navigation URL to determine the place within the page hierarchy at which the partial refresh is to be performed includes determining a location of the one or more URL anchors included in the navigation URL.

5. The method of claim 1, wherein retrieving the page content data includes using a page markup identifier included in the navigation URL to obtain associated page markup data from a remote server.

6. The method of claim 1, wherein the page hierarchy includes a top level comprising a single master page and one or more child levels.

7. The method of claim 6, wherein a first child level is rendered within the master page and a second child level of the first child level, instances of which are rendered within an associated page of the first child level.

8. The method of claim 1, wherein the application comprises a composed application.

9. The method of claim 1, wherein the application is composed using an application composition tool.

10. The method of claim 9, wherein the application composition tool provides an ability to define the page hierarchy.

11. The method of claim 10, wherein the application composition tool provides an ability to define the user interaction and to associate the user interaction with the partial page refresh.

12. The method of claim 1, wherein the determining the place within the page hierarchy of the multi-level page associated with the navigation URL at which the partial refresh is to be performed, which of the plurality of levels of the multi-level page are to be refreshed, and which page content to retrieve further comprises:
   generating a list of pages involved in the page hierarchy of the multi-level page associated with the navigation URL;
   comparing a current page hierarchy with a previous page hierarchy and determining a level in one of the current page hierarchy and the previous page hierarchy that requires refresh; and
   retrieving, from a server, page configuration for each page URL starting from the level of the one of the current page hierarchy and the previous page hierarchy at which refresh is started to an end of the list of pages involved in the page hierarchy of the page associated with the navigation URL.

13. The method of claim 12, further comprising:
replacing retrieved page markup at a corresponding level in the page hierarchy of the multi-level page associated with the navigation URL.

14. The method of claim 1, wherein the navigation URL is formed based on a URL template embodied in application code,
wherein the URL template is populated using one or more values associated with at least one of the user interaction and a current context of an application.

15. The method of claim 14, wherein the current context includes one or more of an identifier or attribute associated with a data object that is associated with the current context.

16. The method of claim 1, wherein the determining the place within the page hierarchy of the page associated with the navigation URL at which the partial refresh is to be performed comprises:
processing a string corresponding to an address of the navigation URL to determine the place within the page hierarchy of the page associated with the navigation URL at which the partial refresh is to be performed.

17. The method of claim 1, wherein the multi-level page includes a top level comprising a master page, and one or more child levels, wherein the one or more child level comprises an application page or an instance page.

18. The method of claim 17, wherein the master page includes a designated area to display an application or instance page.

19. The method of claim 17, wherein the application page displays information outside a context of an instance of a particular object, and the instance page displays a data bearing object type associated with a corresponding instance page.

20. A computer system, comprising:
a communication interface; and
a processor coupled to the communication interface and configured to:
receive a navigation Uniform Resource Locator (URL) generated by an application in response to a user interaction, wherein the navigation URL is associated with an address of a multi-level page comprising a plurality of levels associated with a page hierarchy of the multi-level page, and indicates a place within the page hierarchy at which a partial refresh of a multi-level page with which the navigation URL is associated is to be performed and the navigation URL includes one or more URL anchors usable to retrieve page content data to be used to partially refresh the multi-level page, wherein one or more of the plurality of levels of the multi-level page have corresponding one or more page sections in which content is provided;
update at least one URL anchor in a browser address bar with the one or more URL anchors as a user interacts with the application;
modify a current context in association with the update of the at least one URL anchor;
compare an updated URL anchor with a previous page URL anchor;
determine the place within the page hierarchy of the multi-level page associated with the navigation URL at which the partial refresh is to be performed, wherein the place within the page hierarchy of the multi-level page is determined based at least in part on the comparison of the updated URL anchor with the previous page URL anchor;
determine which of the plurality of levels of the multi-level page are to be refreshed based at least in part on the place within the page hierarchy of the multi-level page associated with the navigation URL at which the partial refresh is to be performed;
determine which page content to retrieve based at least in part on the plurality of levels of the multi-level page determined to be refreshed; and
retrieve, via a communication sent via the communication interface, page content data for the determined page content based at least in part on the navigation URL.

21. The system of claim 20, wherein an application with which the multi-level page is associated is configured to provide the navigation URL in response to one or both of a user interaction and an application context.

22. The system of claim 21, wherein the application is configured to provide the navigation URL at least in part by updating a location of the one or more URL anchors included in the navigation URL.

23. The system of claim 22, wherein processing the navigation URL to determine the place within the page hierarchy at which the partial refresh is to be performed includes determining a location of the one or more URL anchors the navigation URL.

24. The system of claim 20, wherein using the navigation URL to retrieve the page content data includes using a page markup identifier included in the navigation URL to obtain associated page markup data from a remote server.

25. The system of claim 20, wherein the page hierarchy includes a top level comprising a single master page and one or more child levels.

26. A computer program product embodied in a tangible non-transitory computer readable storage medium and comprising computer instructions for:
receiving a navigation Uniform Resource Locator (URL) generated by an application in response to a user interaction, wherein the navigation URL is associated with an address of a multi-level page comprising a plurality of levels associated with a page hierarchy of the multi-level page, and indicates a place within the page hierarchy at which a partial refresh of a page with which the navigation URL is associated is to be performed and the navigation URL includes one or more URL anchors usable to retrieve page content data to be used to partially refresh the multi-level page, wherein one or more of the plurality of levels of the multi-level page have corresponding one or more page sections in which content is provided;
updating at least URL anchor in a browser address bar with the one or more URL anchors as the user interacts with the application;
modifying a current context in association with the update of the at least one URL anchor;
comparing an updated URL anchor with a previous page URL anchor;
determining the place within the page hierarchy of the multi-level page associated with the navigation URL at which the partial refresh is to be performed, wherein the place within the page hierarchy of the multi-level page is determined based at least in part on on the comparison of the updated URL anchor with previous page URL anchor;
determining which of the plurality of levels of the multi-level page are to be refreshed based at least in part on the place within the page hierarchy of the multi-level page associated with the navigation URL at which the partial refresh is to be performed;

determining which page content to retrieve based at least in part on the plurality of levels of the multi-level page determined to be refreshed; and retrieving page content data for the determined page content based at least in part on the navigation URL.

* * * * *

UNITED STATES PATENT AND TRADEMARK OFFICE
CERTIFICATE OF CORRECTION

Page 1 of 1

PATENT NO. : 9,841,863 B1
APPLICATION NO. : 13/722833
DATED : December 12, 2017
INVENTOR(S) : Sachin G. Totale et al.

It is certified that error appears in the above-identified patent and that said Letters Patent is hereby corrected as shown below:

In the Claims

Claim 26:
Column 8, Line 63, delete duplicative "on"

Signed and Sealed this
Twentieth Day of November, 2018

Andrei Iancu
*Director of the United States Patent and Trademark Office*